(12) United States Patent
Gulbeden et al.

(10) Patent No.: US 8,019,790 B2
(45) Date of Patent: Sep. 13, 2011

(54) SYSTEM AND METHOD OF DYNAMICALLY CHANGING FILE REPRESENTATIONS

(75) Inventors: Aziz Gulbeden, Austin, TX (US); Ramesh Radhakrishnan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 288 days.

(21) Appl. No.: 11/484,816

(22) Filed: Jul. 11, 2006

(65) Prior Publication Data

US 2008/0016021 A1 Jan. 17, 2008

(51) Int. Cl.
G06F 7/00 (2006.01)
G06F 17/30 (2006.01)

(52) U.S. Cl. .................. 707/802; 707/727; 707/783

(58) Field of Classification Search .................. None
See application file for complete search history.

(56) References Cited

U.S. PATENT DOCUMENTS

| | | | |
|---|---|---|---|
| 5,333,311 A | 7/1994 | Whipple, II | |
| 5,608,890 A * | 3/1997 | Berger et al. ................. | 711/113 |
| 6,272,235 B1 * | 8/2001 | Bacus et al. ................. | 382/133 |
| 6,374,056 B1 * | 4/2002 | Umetsu et al. ............... | 396/299 |
| 6,389,420 B1 * | 5/2002 | Vahalia et al. ................ | 707/8 |
| 6,442,682 B1 * | 8/2002 | Pothapragada et al. .......... | 713/1 |
| 6,487,633 B1 * | 11/2002 | Horst et al. .................... | 711/112 |
| 6,810,200 B1 * | 10/2004 | Aoyama et al. ................ | 386/94 |
| 6,889,249 B2 * | 5/2005 | Miloushev et al. ............. | 709/213 |
| 2003/0005248 A1 * | 1/2003 | Selkirk et al. ................. | 711/165 |
| 2003/0210790 A1 * | 11/2003 | Riedel et al. .................. | 380/277 |
| 2004/0083339 A1 | 4/2004 | Yamamoto et al. | |
| 2005/0193216 A1 * | 9/2005 | Gurda et al. .................. | 713/200 |
| 2005/0198209 A1 * | 9/2005 | Barrett .......................... | 709/219 |
| 2006/0080365 A1 | 4/2006 | Glover et al. | |

FOREIGN PATENT DOCUMENTS

| | | |
|---|---|---|
| EP | 0415352 | 3/1991 |
| EP | 1677306 | 7/2006 |
| JP | 8083202 | 3/1996 |
| JP | 2003296152 | 8/2003 |

OTHER PUBLICATIONS

Search Report for Singapore Patent Application No. 200703951-4 dated Nov. 21, 2007, 6 pgs.
Search and Examination Report issued by UK Intellectual Property Office for European Patent Application No. 0712313.6 dated Oct. 23, 2007, 11 pages.

* cited by examiner

*Primary Examiner* — Khanh B Pham
*Assistant Examiner* — Azam Cheema
(74) *Attorney, Agent, or Firm* — Larson Newman, LLP

(57) ABSTRACT

An information handling system is disclosed and can include a processor and a memory in communication with the processor. Further, a file access monitor can be embedded within the memory. The file access monitor can monitor one or more files within the information handling system and dynamically change a file representation associated with each of the one or more files based on access patterns associated with each of the one or more files.

19 Claims, 4 Drawing Sheets

SYSTEM AND METHOD OF DYNAMICALLY CHANGING FILE REPRESENTATIONS

FIELD OF THE DISCLOSURE

The present disclosure relates generally to distributed file systems. More specifically, the present disclosure relates to dynamically changing file representations within a distributed file system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Certain types of information handling systems, e.g., distributed file systems, can employ different file representation schemes, which can vary based on the type of system. Some distributed file systems, such as a parallel virtual file system (PVFS), can employ striping to improve performance for large operations. Other systems can use a log or a journal based approach for speed and reliability. Still other systems can use plain, or regular, files due to the relative simplicity of such files.

Striping and parallel input/output (IO) operations work well for large file system operations. However, for small file system operations, striping increases the overhead and can result in relatively poor performance. For write intensive operations, log or journal based systems can result in relatively higher performance because these systems can use cache effectively and make writes sequentially. Read operations in such systems can incur more overhead.

Distributed file systems that support different file representation schemes can allow a user to manually make a decision on how a file should be stored. Other parameters, such as the stripe size, may be fixed or manually set by the user. These systems do not provide an automated way to make these decisions by the file system and not the user.

Accordingly, there is a need for a system and method of dynamically changing file representations.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

An information handling system is disclosed and can include a processor and a memory in communication with the processor. Further, a file access monitor can be embedded within the memory. The file access monitor can monitor one or more files within the information handling system and change a file representation associated with each of the one or more files based on access patterns associated with each of the one or more files.

As indicated above, the following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. For example, much of the following focuses on dynamically changing file representations within a distributed file systems. While the teachings may certainly be utilized in this application, the teachings may also be utilized in other applications and with several different types of architectures such as distributed computing architectures, client/server architectures, or middleware server architectures.

Figure 1:
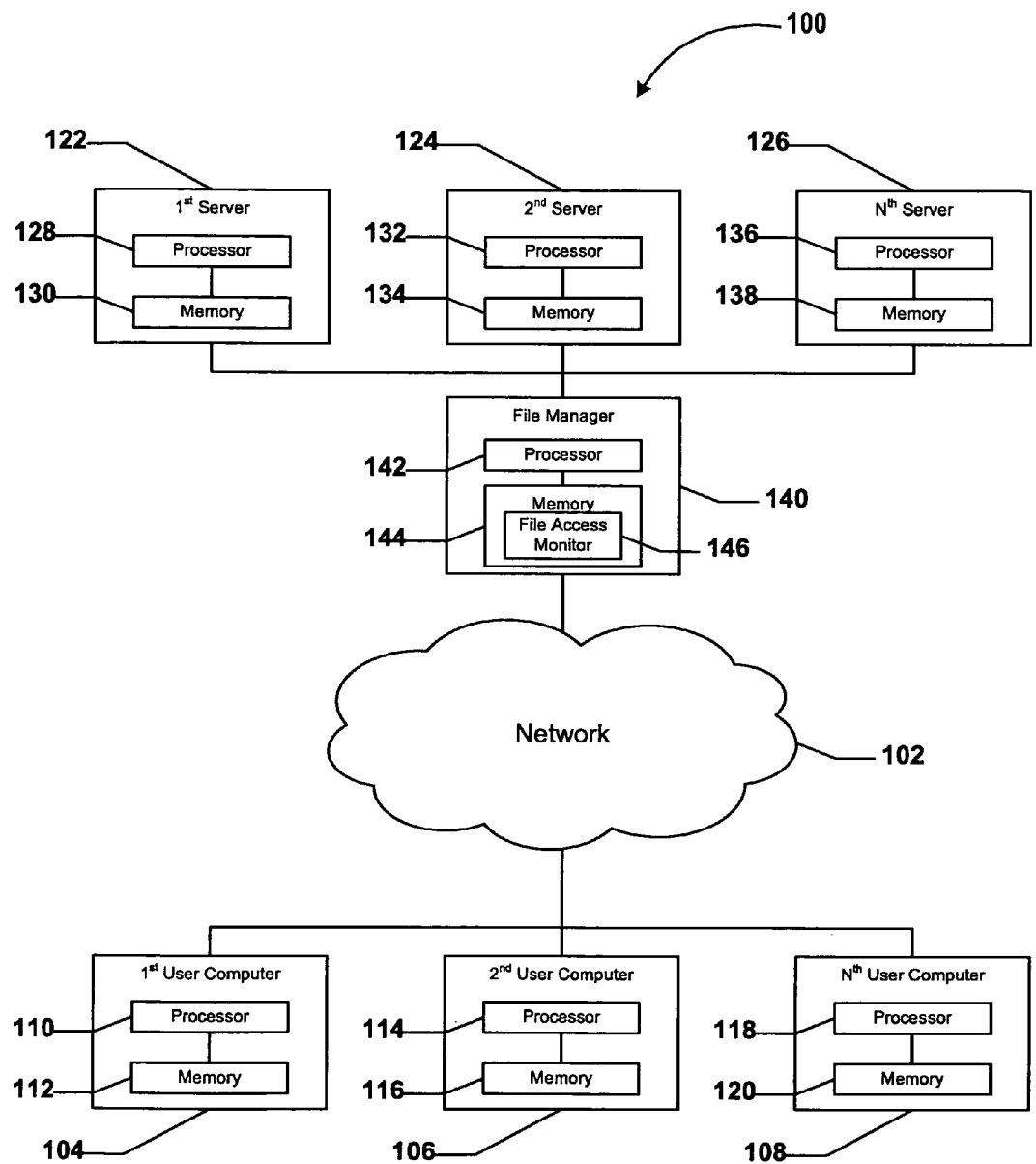
FIG. 1 is a general diagram illustrating an information handling system.

Referring initially to FIG. 1, an information handling system is shown and is generally designated 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In a particular embodiment, as shown in FIG. 1, the information handling system 100 can include a network 102. For example, the network 102 can be a wide area network (WAN), a local area network (LAN), or a combination thereof.

As illustrated in FIG. 1, the system 100 can include a first user computer 104, a second user computer 106, and an Nth user computer 108 coupled to the network. The first user computer 104 can include a processor 110 and a memory 112 coupled to the processor 110. The second user computer 106 can include a processor 114 and a memory 116 coupled to the processor 114. Additionally, the Nth user computer 108 can include a processor 118 and a memory 120 coupled to the processor 118.

The system 100 can further include a first file server 122, a second file server 124, and an Nth file server 126 coupled to the network. The first file server 122 can include a processor 128 and a memory 130 coupled to the processor 128. The second file server 124 can include a processor 132 and a memory 134 coupled to the processor 132. Moreover, the Nth file server 126 can include a processor 136 and a memory 138 coupled to the processor 136. In a particular embodiment, the file servers 122, 124, 126 can be connected to the network 102 via a file manager server 140. The file manager server 140 can include a processor 142 and a memory 144 coupled to the processor 142. A file access monitor 146 can be embedded within the memory 144 of the file manager server 140. The file access monitor 146 can include logic that can be executed in order to manage one or more files that can be stored within the file servers 122, 124, 126.

In an alternative embodiment, the file access monitor 146 can be embedded within the memory 130, 134, 138 of one of the other servers 122, 124, 126. Further, the file access monitor 146 can be embedded within the memory 112, 116, 120 of one of the user computers 104, 106, 108.

In a particular embodiment, the files can be stored within the servers 122, 124, 126 as three different representations. For example, a particular file can be stored as a large file representation, a regular file representation, or a write file representation. The large file representation can include a striped file representation in which the file can be divided into stripes and each stripe can be stored at a different server. Stripe size is a parameter than can be set, or defined, by a user. The regular file representation indicates that the file is to be stored as is. The write file representation is a representation of a file that is efficient for files that include frequent write operations. The write file representation can include a log-structured file representation.

The file system monitor 146 can monitor the files within the system 100 at the file level without interruption. Further, based on file activity, the file system monitor 146 can choose a file representation for each file that substantially maximizes efficiency of the system 100. The file system monitor 146 can monitor each file within the system 100 to determine whether a current file representation for each file is an optimal file representation. Also, the file system monitor 146 can determine an optimal file representation for each file based on the access characteristic for each file. Additionally, the file system monitor 146 can dynamically change a file representation for each file from a regular file representation to a large file representation, from a regular file representation to a write file representation, from a large file representation to a regular file representation, and from a write file representation to a regular file representation.

In a particular embodiment, when the file system monitor 146 determines that an access pattern for a particular file is suitable for a different file representation, the file system monitor 146 can automatically and dynamically change the file representation in order to increase the performance of the system 100. The file system monitor 146 can track metadata information, e.g., operation type, operation frequency, and file size associate with the operation, for every file that is created and stored in the system 100.

Also, in a particular embodiment, when the file system monitor 146 determines that access to a regular file is happening in large block sizes, the file system monitor 146 can convert the file from a regular file representation to a large file representation, e.g., to a striped file, in order to take advantage of parallel access. The threshold to categorize an access size as large can be set beforehand by system designers, or the file system can use one or more heuristics to determine the threshold. When the file system monitor 146 determines that access to a large file is occurring at random offsets, the file system monitor 146 can convert the large file representation to a regular file representation. This conversion can minimize additional overhead by avoiding the need to connect multiple input/output servers to handle the large file representation.

Further, when the file system monitor 146 determines an amount of writes to a regular file is substantially greater than an amount of reads from the same regular file, the file system monitor 146 can convert the regular file to a write file representation, e.g., a log-structured file representation, in order to take advantage of sequential access to the memory. Additionally, when the file system monitor 146 determines that an amount of reads of a write file representation is substantially greater than an amount of writes to the same file, the file system monitor 146 can convert the write file representation to a regular file representation in order to reduce overhead associated with reading the log for the file.

When the decision is made to change the way a file is stored, the file system monitor 146 can perform the transition transparently. Thus, one or more applications accessing the file can continue to perform operations on the file while the transition occurs. In order to reduce the penalty due to the overhead incurred while changing the way a file is represented, some limits can be placed on how frequently a file's representation can be changed. For example, a particular file may only be changed once or twice per every one thousand accesses through the use of a lock that avoids change in file representation operation for a predetermined period.

The file system monitor 146 may also delay transitions for a particular time in order to confirm a file access pattern. This can limit the number of transitions and can avoid the overhead penalty due to making incorrect decisions. In a particular embodiment, the threshold values, described herein, that can trigger changes between file representations can be set manually by the system engineers. Alternatively, the file system monitor 146 can determine the thresholds values based on one or more heuristics. Further, the file system monitor 146 can wait to make a change to a file when there are not any open handles on the file in question. This can substantially eliminate overhead issues from a user's perspective and can ensure that the user does not have the file open for any operations. As such, the user can remain unaware of any transition of file representation.

Using the methods described herein, the system 100 can determine an optimal representation scheme for the files stored therein and the system 100 can increase the efficiency of handling those files.

Figure 2:
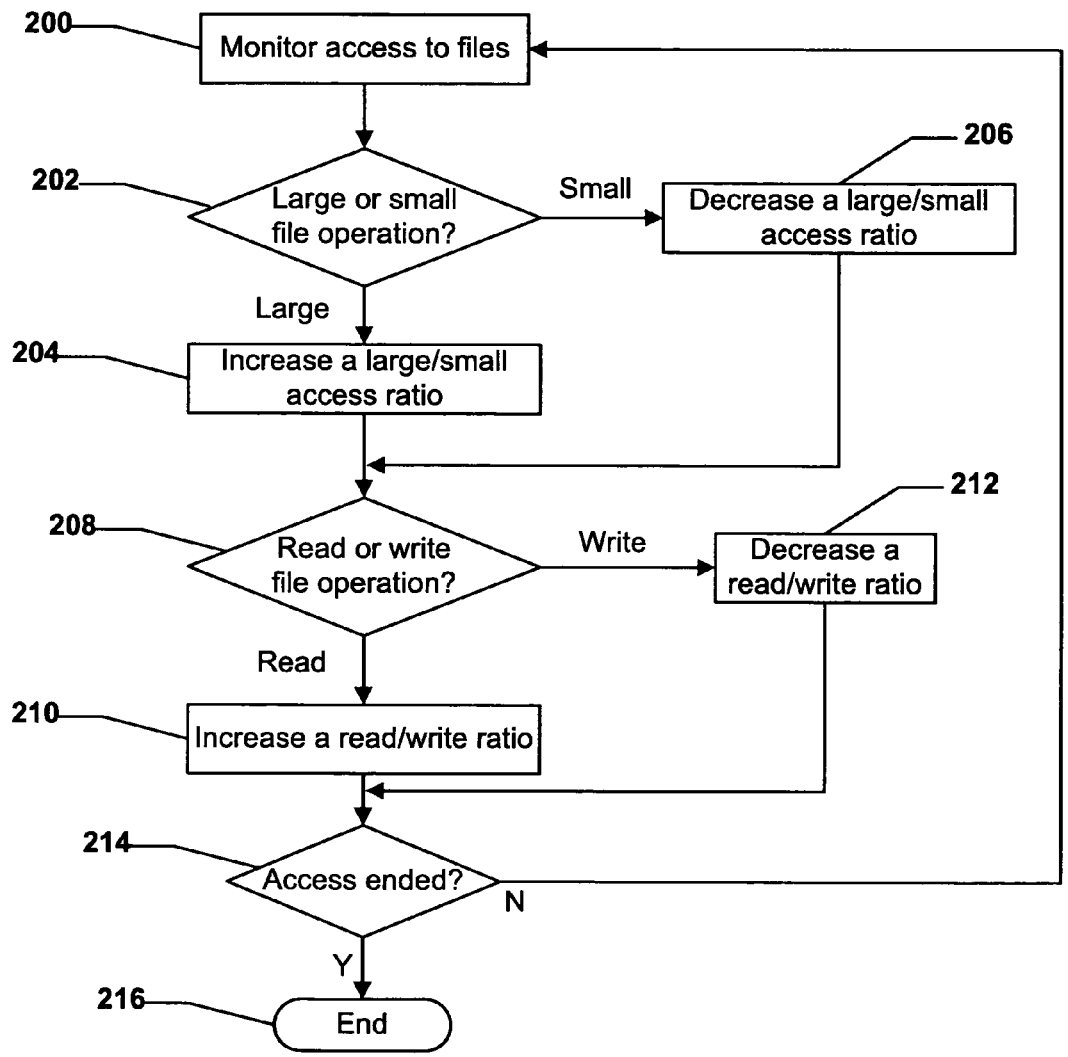
FIG. 2 is a flow chart illustrating a method of monitoring files within an information handling system.

Referring to FIG. 2, a method of monitoring one or more files is shown and commences at block 200. At block 200, a file access monitor can access to a plurality of files within a system having one or more file servers, e.g., the system 100 described herein. At decision step 202, the file access monitor can determine whether a particular access includes a large file operation or a small file operation. In a particular embodiment, the access can be considered a large file operation if the access involves a block of data greater than or equal to one megabyte (1 MB).

At decision step 202, if the access includes a large file operation, the method continues to block 204 and a large/small access ratio can be increased. The large/small access ratio can include a large access counter and a small access counter and the large/small access ratio can be increased by increasing the large access counter. Alternatively, the large/small access ratio can be increased by decreasing the small access counter. At decision step 202, if the access includes a small file operation, the method can move to block 206 and the large/small ratio can be decreased. The large/small ratio can be decreased by increasing the small access counter. Alternatively, the large/small ratio can be decreased by decreasing the large access counter.

From block 204 or block 206, the method can continue to decision step 208 and the file access monitor can determine whether the access to the file includes a read operation or a write operation. If the file access includes a read operation, the method can proceed to block 210 and a read/write ratio can be increased. The read/write access ratio can include a read access counter and a write access counter. Further, the read/write access ratio can be increased by increasing the read access counter. Alternatively, the read/write access ratio can be increased by decreasing the write access counter. At decision step 208, if the access includes a write file operation, the method can move to block 212 and the read/write ratio can be decreased. The read/write ratio can be decreased by increasing the write access counter. Alternatively, the read/write ratio can be decreased by decreasing the read access counter.

From block 210 or block 212, the method can proceed to decision step 214 and the file access monitor can determine if access to the files has ended. If the access has not ended, the method can return to block 200 and continue as described herein. Otherwise, if the access has ended, the method can end at state 216.

Figure 3:
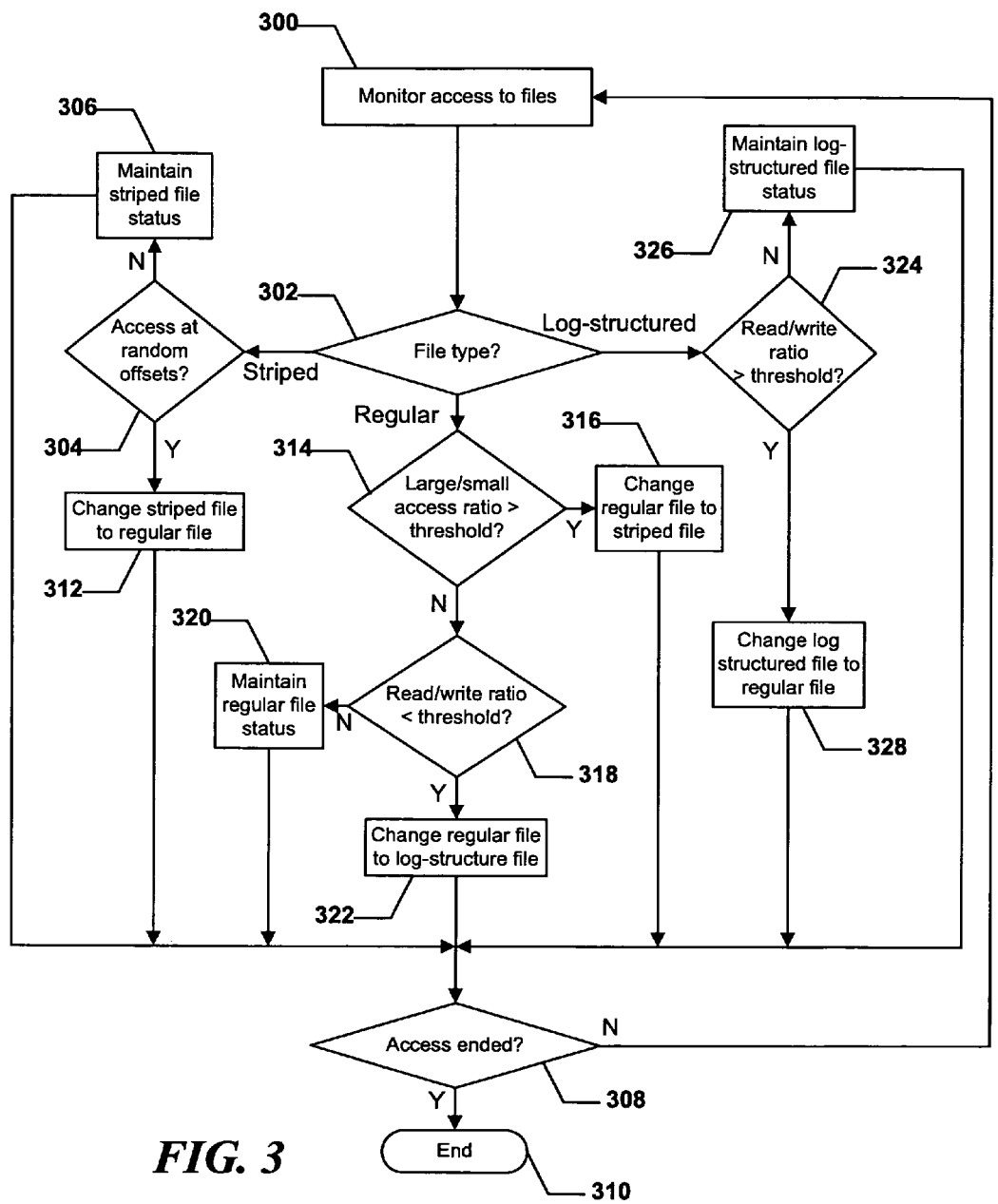
FIG. 3 is a flow chart illustrating a method of dynamically changing file representations within an information handling system.

Referring now to FIG. 3, a method of dynamically changing file representations is shown. The method can be executed by a file access monitor, e.g., the file access monitor 146 shown and described above in conjunction with the system 100. Commencing at block 300, the file access monitor can monitor access to one or more files within the system 100. At decision step 302, the file access monitor can determine a file representation associated with the file. For example, the file representation can be a large file representation, a regular file representation, or a write file representation. Further, the large file representation can be a striped file and the write file representation can be a log-structured file.

If the file is a striped file, the method can proceed to decision step 304, and the file access monitor can determine whether the access to the striped file is at random offsets. If not, the method moves to block 306 and the file access monitor maintains the file as a striped file. The method can then proceed to decision step 308 and the file access monitor can determine if access to the files in the system has ended. If not, the method can return to block 300 and continue as described herein. If access to the files ends, the method can end at state 310.

Returning to decision step 304, if the access to the striped file is at random offsets, the method can move to block 312 and the file access monitor can change the striped file to a regular file. In a particular embodiment, changing the striped file to a regular file can minimize additional overhead by avoiding the need to connect multiple input/output servers to handle the large file representation. From block 312, the method can proceed to decision step 308 and continue as described herein.

Returning to decision step 302, if the file is a regular file, the method can move to decision step 314. At decision step 314, the file access monitor can determine if a large/small access ratio for the file is greater than a threshold. For example, the threshold can be five. If the large/small access ratio is greater than the threshold, the method can move to block 316 and the file access monitor can change the regular file to a striped file. Thereafter, the method can move to decision step 308 and continue as described herein.

At decision step 314, if the large/small access ratio is less than the threshold, the method can proceed to decision step 318 and the file access monitor can determine whether the read/write ratio is less than a threshold. If the read/write ratio is not less than the threshold, the method can continue to block 320 and the file access monitor can maintain the file as a regular file. The method can then move to decision step 308 and continue as described herein.

Returning to decision step 318, if the read/write ratio is less than the threshold, the method can proceed to block 322 and the file access monitor can change the regular file to a log-structured file. In a particular embodiment, the log-structured file representation can provide greater efficiency for write operations. Further, as the read/write ratio decreases, it can be an indication that the access to the file includes greater write operations than read operations. From block 322, the method can move to decision step 308 and continue as described herein.

Returning to decision step 302, if the file representation is log-structured, the method can move to decision step 324 and the file access monitor can determine whether a read/write ratio associated with the log-structured file is greater than a threshold. If the read/write ratio is not greater than the threshold, the method can move to block 326 and the file access monitor can maintain the file as a log-structured file. The method can then move to decision step 308 and continue as described herein.

At decision step 324, if the read/write ratio is greater than the threshold, the method can move to block 328 and the file access monitor can change the log-structured file to a regular file. Thereafter, the method can move to decision step 308 and continue as described herein.

Figure 4:
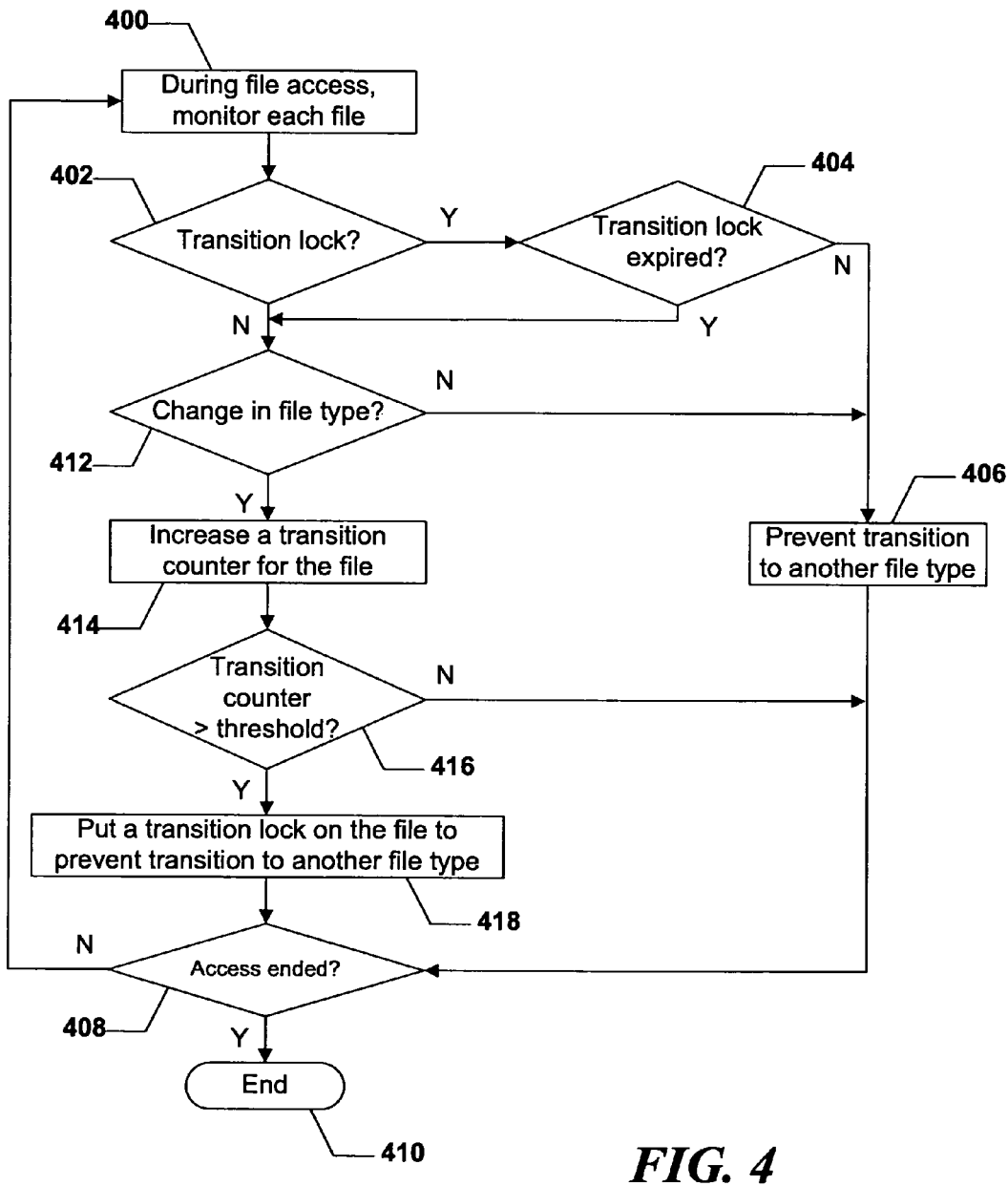
FIG. 4 is a flow chart illustrating a method of preventing changes to file representations within an information handling system.

Referring to FIG. 4, a method of preventing file representation transition is shown. In a particular embodiment, the method can be executed by a file access monitor, e.g., the file access monitor 146 shown and described above in conjunction with the system 100. Commencing at block 400, the file access monitor can monitor each file within the system 100. At decision step 402, the file access monitor can determine whether a transition lock is on a particular file to be accessed. If so, the method can move to decision step 404 and the file access monitor can determine whether the transition lock on the file is expired. If the transition lock is expired, the method can move to block 406 and the file access monitor can prevent a transition to another file representation. Thereafter, the method can move to decision step 408 and the file access monitor can determine whether access to the files within the system has ended. If access ends, the method can end at state 410. Otherwise, if the access continues, the method can return to block 400 and continue as described herein.

At decision step 402, if a transition lock is not on a file, the method can proceed to decision step 412. The method can also proceed to decision step 412 from decision step 404 if the transition lock is expired.

At decision step 412, the file access monitor can determine whether the access to the file has caused the file representation to change. For example, the file representation can change from a striped file to a regular file, from a regular file to a striped file, from a regular file to a log-structured file, or from a log-structured file to a regular file. If the access has not caused a change in file representation, the method can move to decision step 408 and continue as described herein.

At decision step 412, if the access causes the file representation to change, the method can move to block 414 and the file access monitor can increase a transition counter for the file. Moving to decision step 416, the file access monitor can determine whether the transition counter for the file is greater than a threshold. If the transition counter is not greater than the threshold, the method can move to decision step 408 and continue as described herein. Conversely, if the transition counter is greater than the threshold, the method can proceed to block 418 and the file access manager can put a transition lock on the file to prevent a transition to another file representation. Thereafter, the method can move to decision step 408 and continue as described herein.

With the configuration of structure described herein, the system and method can provide a system and method of dynamically changing file representations within a distributed file system. For example, the file representation can change from a striped file to a regular file, from a regular file to a striped file, from a regular file to a log-structured file, or from a log-structured file to a regular file. Further, the system can lock a particular file to prevent the file representation from changing too frequently.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-implemented method of dynamically changing a file representation, comprising:
   monitoring access to a file;
   detecting an access pattern associated with the file, wherein the access pattern is an operation type and an operation frequency for the file;
   dynamically changing, by a computer without user intervention, a file representation of the file to another file representation based on the detected access pattern associated with the file, wherein the other file representation includes a large file representation, a regular file representation or a write file representation;
   determining a frequency of changing the file representation of the file;
   locking the file to prevent the changing of the file representation for a predetermined amount of time in response to the frequency reaching a threshold frequency; and
   unlocking the file to permit the changing of the file representation after the predetermined amount of time.

2. The method of claim 1, wherein the file representation includes information regarding how the file is to be stored within a distributed file system.

3. The method of claim 1, further comprising:
   determining whether access to the file includes a read operation or a write operation;
   decreasing a ratio of read operations to write operations when access to the file includes the write operation; and
   increasing the ratio when access to the file includes the read operation.

4. The method of claim 3, further comprising storing the file within a distributed file system.

5. The method of claim 4, wherein dynamically changing the file representation comprises dynamically changing the file representation from a striped file representation to a regular file representation when the access to the file is at random offsets.

6. The method of claim 4, wherein dynamically changing the file representation comprises dynamically changing the file representation from a regular file representation to a striped file representation when a ratio of large file operations to small file operations is greater than a threshold.

7. The method of claim 4, wherein dynamically changing the file representation comprises dynamically changing the file representation from a regular file representation to a log-structured file representation when a ratio of read operations to write operations is less than a threshold.

8. The method of claim 4, wherein dynamically changing the file representation comprises dynamically changing the file representation from a log-structured file representation to a regular file representation when a ratio of read operations to write operations is greater than a threshold.

9. A computer-implemented method of preventing file transitions, comprising:
   dynamically changing, by a computer without user intervention, a file representation associated with a file to another file representation based on an access pattern associated with the file, when a transition lock is not in place on the file, wherein the other file representation includes a large file representation, a regular file representation or a write file representation;
   storing the file after determining whether the transition lock is in place on the file;
   increasing a transition counter for the file when the file representation changes; and
   locking the file to prevent a change in the file representation when the transition counter is greater than a threshold during a specific number of accesses to the file;
   resetting the transition counter after the specific number of accesses to the file; and
   unlocking the file in response to the transition counter being reset.

10. The method of claim 9, further comprising:
    determining whether the transition lock is expired;
    changing a file representation associated with the file when the transition lock is expired; and
    preventing a change in the file representation associated with the file when the transition lock is not expired.

11. An information handling system, comprising:
    a processor;
    a memory in communication with the processor; and
    a file access monitor embedded within the memory, wherein the file access monitor is configured to monitor a file within the information handling system, to dynamically change, without user intervention, a file representation associated with the file to another file representation based on an access pattern associated with the file, to determine a frequency of changing the file representation of the file, and to lock the file to prevent the changing of the file representation for a predetermined amount of time in response to the frequency reaching a threshold frequency, wherein the other file representation includes a large file representation, a regular file representation or a write file representation, and wherein the change of the file representation is performed while one or more applications continue to perform operations on the file.

12. The system of claim 11, wherein the file access monitor comprises logic to:
    monitor access to the file; and
    determine whether access to the file includes a large file operation or a small file operation.

13. The system of claim 11, wherein the file representation includes information regarding how the file is to be stored within a distributed file system.

14. The system of claim 13, wherein the file access monitor further comprises logic to:
    determine whether access to the file includes a read operation or a write operation;
    decrease a ratio of read operations to write operations when access to the file includes the write operation; and
    increase the ratio of read operations to write operations when access to the file includes the read operation.

15. The system of claim 14, wherein the file access monitor further comprises logic to:
    determine a file representation;
    change the file representation from a striped file representation to a regular file representation when the access to the file is at random offsets;
    change the file representation from a regular file representation to a striped file representation when a ratio of large file operations to small file operations is greater than a threshold;
    change the file representation from a regular file representation to a log-structured file representation when the ratio of read operations to write operations falls is less than a threshold; and
    change the file representation from a log-structured file representation to a regular file representation when the ratio of read operations to write operations is greater than a threshold.

16. The system of claim 11, wherein the file access monitor further comprises logic to:
    determine whether a transition lock is in place on a file; and
    allow a change in a file representation associated with the file when the transition lock is not in place.

17. The system of claim 16, wherein the file access monitor further comprises logic to:
    determine whether the transition lock is expired; and
    allow a change in a file representation associated with the file when the transition lock is expired.

18. The system of claim 11, wherein the file access monitor further comprises logic to increase a transition counter for the file when the file representation changes.

19. The system of claim 18, wherein the file access monitor further comprises logic to prevent a change in the file representation when the transition counter is greater than a threshold.

* * * * *